US012811239B2

(12) United States Patent
Origuchi et al.

(10) Patent No.: US 12,811,239 B2
(45) Date of Patent: Nov. 24, 2026

(54) BATTERY PACK COMPRISING GAS DISCHARGE MEANS

(71) Applicants: RENAULT S.A.S, Boulogne Billancourt (FR); NISSAN MOTOR CO., LTD., Yokohama (JP)

(72) Inventors: Masato Origuchi, Guyancourt (FR); Natalie Rat, Guyancourt (FR)

(73) Assignees: AMPERE S.A.S., Boulogne Billancourt (FR); NISSAN MOTOR CO., LTD., Yokohama (JP)

( * ) Notice: Subject to any disclaimer, the term of this patent is extended or adjusted under 35 U.S.C. 154(b) by 645 days.

(21) Appl. No.: 18/248,574

(22) PCT Filed: Oct. 11, 2021

(86) PCT No.: PCT/EP2021/078057
§ 371 (c)(1),
(2) Date: Apr. 11, 2023

(87) PCT Pub. No.: WO2022/078962
PCT Pub. Date: Apr. 21, 2022

(65) Prior Publication Data

US 2023/0411775 A1 Dec. 21, 2023

(30) Foreign Application Priority Data

Oct. 14, 2020 (FR) .................................... 20 10499

(51) Int. Cl.
*H01M 50/342* (2021.01)
*H01M 50/204* (2021.01)
(Continued)

(52) U.S. Cl.
CPC ..... *H01M 50/3425* (2021.01); *H01M 50/204* (2021.01); *H01M 50/224* (2021.01);
(Continued)

(58) Field of Classification Search
None
See application file for complete search history.

(56) References Cited

U.S. PATENT DOCUMENTS 11,394,079 B2 * 7/2022 Wynn ................. H01M 50/367
11,975,617 B2 * 5/2024 Wang ........................ B60K 1/04
(Continued)

FOREIGN PATENT DOCUMENTS

CN 111384328 A 7/2020
JP 2009-105007 5/2009
WO WO 2020/120796 A1 6/2020

OTHER PUBLICATIONS

International Search Report issued Jan. 12, 2022 in PCT/EP2021/078057, filed on Oct. 11, 2021, 2 pages.
(Continued)

*Primary Examiner* — Kevin M Bernatz
(74) *Attorney, Agent, or Firm* — Oblon, McClelland, Maier & Neustadt, L.L.P.

(57) ABSTRACT

An energy storage device includes a set of electrochemical modules and a housing enclosing the modules. The housing includes a double-walled structure. Each module includes electrochemical cells and an enclosure surrounding the electrochemical cells. The enclosure is provided with at least one weak zone capable of discharging gases contained inside the module. The structure includes an inner wall, an outer wall, and at least one chamber defined between the inner wall and the outer wall. The inner wall is provided with a set of openings positioned opposite the at least one weak zone of each module and the outer wall is provided with at least one discharge opening.

14 Claims, 3 Drawing Sheets

(51) Int. Cl.

| | |
|---|---|
| ***H01M 50/224*** | (2021.01) |
| ***H01M 50/289*** | (2021.01) |
| ***H01M 50/333*** | (2021.01) |
| ***H01M 50/367*** | (2021.01) |

(52) U.S. Cl.

CPC ....... *H01M 50/289* (2021.01); *H01M 50/333* (2021.01); *H01M 50/367* (2021.01); *H01M 2220/20* (2013.01)

(56) References Cited

U.S. PATENT DOCUMENTS 12,401,078 B2 * 8/2025 Ishitobi ................. H01M 50/24
12,412,954 B2 * 9/2025 Hernandez Saab .......................... H01M 50/291
12,469,923 B2 * 11/2025 Hernandez Saab .......................... H01M 50/207
2002/0076604 A1 6/2002 Matsuoka et al.
2011/0174556 A1 * 7/2011 Hermann ................ B60L 50/64 429/62
2014/0272488 A1 * 9/2014 Kim .................... H01M 10/058 429/56
2022/0077539 A1 3/2022 Ren et al.
2024/0297398 A1 * 9/2024 Zhang ................. H01M 50/367
2025/0055105 A1 * 2/2025 Jeong .................. H01M 50/358
2026/0100474 A1 * 4/2026 Baek ................. H01M 50/3425

OTHER PUBLICATIONS

French Preliminary Search Report issued May 21, 2021 in French Application 2010499 filed on Oct. 14, 2020, 3 pages (with Translation of Category of Cited Documents).
Office Action issued Jul. 27, 2026, in Chinese Patent Application No. 202180069849.2, with English translation.

* cited by examiner

BATTERY PACK COMPRISING GAS DISCHARGE MEANS

TECHNICAL FIELD OF THE INVENTION

The invention relates to an energy storage device or battery pack comprising electrochemical cells and means for discharging the gas formed as a result of a malfunction of at least one electrochemical cell. The invention also relates to a motor vehicle including such an energy storage device.

PRIOR ART

Electric vehicles and hybrid vehicles include an energy storage device comprising electrochemical cells for supplying electrical energy to an electric motor. Several electrochemical cells are usually assembled in series or in parallel in an electrochemical module. The electrochemical modules are supported by a structure and connected to each other by electrical conductors, commonly referred to as "busbars". During operation, significant differences in electrical potential can form between the different electrical conductors. The electrical conductors are therefore spaced far enough apart to prevent the formation of an electric arc.

Furthermore, electrochemical cells are liable to failures such as thermal runaway. Gases loaded with metal particles can then be released from the module including the faulty electrochemical cell. The presence of these gases between two electrical conductors with a large potential difference can lead to the formation of an electric arc. Such an electric arc can then create holes in the structure of the energy storage device, for example in a cover of the energy storage device. These holes can then facilitate the ingress of oxygen from the outside. The high temperatures inside the energy storage device combined with these electric arcs and an oxygen supply can then lead to a fire.

An energy storage device comprising a specific internal conduit designed to convey gases to the outside is known from document EP2654100. Such a storage device comprises numerous elements assembled together. Said storage device is complex to manufacture, heavy and bulky.

PRESENTATION OF THE INVENTION

The purpose of the invention is to provide an energy storage device that overcomes the drawbacks mentioned above and improves the energy storage devices known in the prior art.

More specifically, one object of the invention is an energy storage device that is both simple to manufacture and reduces any risk of formation of an electric arc following failure of an electrochemical cell.

SUMMARY OF THE INVENTION

The invention relates to an energy storage device comprising a set of electrochemical modules and a casing containing said modules, the casing comprising a double-walled structure, each module comprising electrochemical cells and an envelope containing said electrochemical cells, the envelope being provided with at least one weak zone enabling gases contained inside the module to escape, said structure comprising an inner wall, an outer wall and at least one chamber formed between the inner wall and the outer wall, the inner wall being provided with a set of openings positioned opposite the at least one weak zone of each module, the outer wall being provided with at least one discharge opening.

Said structure may be an extruded structure, in particular an extruded aluminum structure.

The at least one weak zone formed in the envelope of each module may be an opening, in particular a circular opening.

The surface area of each opening in the inner walls of said structure may be strictly greater than the surface area of the opposing opening of the envelope.

The at least one weak zone may be arranged along a first side of each module, and the energy storage device may comprise electrical conductors connecting the modules together, the electrical conductors being arranged along a second side of each module, substantially opposite the first side, the electrical conductors notably being arranged substantially towards the center of the energy storage device.

The set of electrochemical modules may comprise two parallel rows of electrochemical modules, the energy storage device comprising electrical conductors arranged substantially in an interface zone between the two parallel rows.

The distance between each weak zone and the opening in the opposing inner wall may be equal to or less than 50 mm.

Said at least one chamber may form at least locally a gas discharge chamber towards the at least one discharge opening.

The energy storage device may comprise at least two distinct chambers defined between the inner wall and the outer wall of the structure, the at least two chambers forming at least locally two distinct gas discharge chambers towards at least two distinct discharge openings.

The energy storage device may comprise at least one valve designed to open gradually in the event of excess pressure in said at least one chamber, the at least one valve being arranged in the at least one discharge opening.

The energy storage device may comprise cross members separating adjacent electrochemical modules, the cross members being fastened to said structure.

The invention also relates to a motor vehicle comprising an energy storage device as defined above.

PRESENTATION OF THE FIGURES

These objectives, features and advantages of the present invention are set out in detail in the description below of a specific embodiment provided as a non-limiting example with reference to the following attached figures.

DETAILED DESCRIPTION

Figure 1:
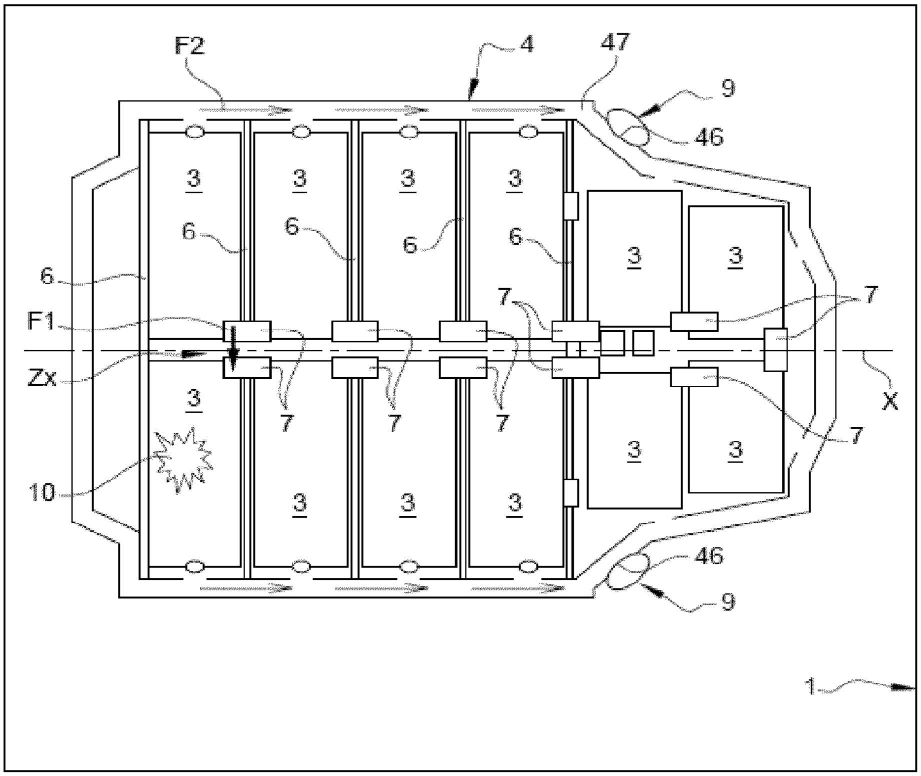
FIG. 1 is a schematic view of a motor vehicle fitted with an energy storage device according to one embodiment of the invention.

FIG. 1 is a schematic view of a motor vehicle 1 according to one embodiment of the invention. The vehicle 1 can for example be an electric vehicle or a hybrid vehicle. The vehicle 1 comprises an energy storage device 2 capable of storing energy in electrochemical form to supply electricity to an electric motor of the vehicle.

The energy storage device 2, which could also be called a "battery pack" or for convenience "device 2", comprises a set of electrochemical modules 3 and a casing containing the modules 3. The casing forms a closed envelope surrounding all the modules 3. Each module 3 comprises electrochemical cells, or accumulators, and an envelope surrounding these cells. The electrochemical cells can, for example, be lithium-ion cells or any other type of cell capable of storing energy in electrochemical form.

According to the embodiment shown in FIG. 1, the device 2 comprises twelve modules 3. Alternatively, there may be any number of modules. The modules 3 can be arranged in two rows comprising an equal number of modules, i.e. two rows of six modules according to the illustrated embodiment. The modules can be positioned next to each other in a horizontal plane when the vehicle 1 is on level ground.

The casing containing the modules 3 comprises a double-walled structure 4. The structure 4 extends laterally about the set of modules 3. The structure may be polygonal, having an overall rectangular or trapezoidal shape. The main function of the structure 4 may be to support all of the modules. The structure is therefore robust and rigid enough to bear the weight of the modules. Furthermore, the structure 4 forms a side protection for the different modules.

Figure 2:
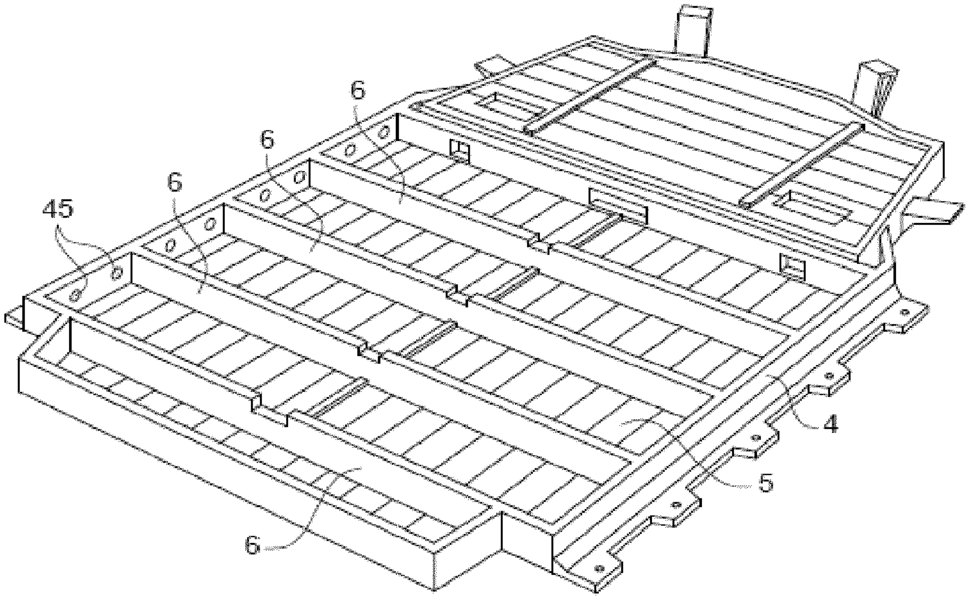
FIG. 2 is an isometric perspective view of a double-walled structure of the energy storage device.

With reference to FIG. 2, the casing also includes a bottom cover 5 fastened to the structure 4 and a top cover (not shown). The bottom cover can extend substantially horizontally under the vehicle and protects the modules 3 from external damage. The device 2 can be fastened, via the casing, to a lower portion of a vehicle body, in particular via the structure 4 thereof.

The device 2 also includes cross members 6 separating adjacent electrochemical modules. The cross members 6 are fastened to the structure 4 and help to hold the different modules. In other words, the cross members 6 form compartments in which the modules 3 are arranged. The cross members 6 can extend parallel to each other between two opposite sides of the structure 4. Said cross members can extend parallel to a transverse axis of the vehicle.

The modules 3 are electrically connected to each other by electrical conductors 7, notably busbars. The electrical conductors 7 can for example be in the form of metal plates or bars and are able to carry high-intensity electrical currents. The metal conductors electrically connect two adjacent modules. Said metal conductors are arranged substantially towards the center of the storage device, i.e. substantially along a midline X separating the device 2 into two equal halves. In other words, the metal conductors are arranged substantially in an interface zone Zx defined between the two parallel rows of modules. The midline X can be substantially parallel to a longitudinal axis of the vehicle.

Figure 3:
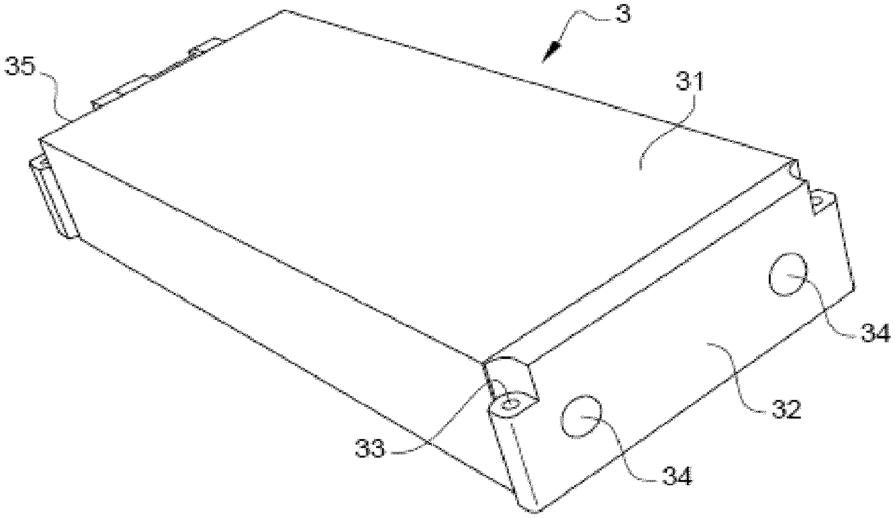
FIG. 3 is a perspective view of an electrochemical module of the energy storage device.

FIG. 3 shows an electrochemical module 3 according to one embodiment of the invention. Said electrochemical module comprises an envelope 31 having an overall parallelepiped shape covering the electrochemical cells. The module 3 can for example have dimensions of the order of 200 mm by 200 mm by 400 mm. The envelope 31 can form a protective seal for the electrochemical cells of the module 3. The envelope 31 can for example be a casing. Said envelope comprises a first side 32 facing the structure 4. The module 3 can include fastening means 33 in the form of vertical openings intended to cooperate with screws. Thus, the module 3 can be rigidly connected to the bottom cover 5, which is in turn supported by the structure 4, or to any other structural element fastened to the structure 4.

The envelope 31 further comprises two weak zones 34 arranged on the first side 32. Alternatively, the module may have a different number of weak zones: for example one, three, four or five weak zones, or even more. These weak zones may be positioned on different sides of the module 3. The weak zones 34 enable gases contained inside the electrochemical module to escape. In other words, when one or more of the electrochemical cells contained in the module 3 releases gas as a result of a malfunction, gas can escape from the envelope 31 via the weak zones 34 thereof.

According to one embodiment of the invention, these weak zones 34 may be simple openings in the envelope, for example circular openings. In this case, the envelope 31 is not sealed and the openings are the only openings in the envelope. In another variant embodiment, the weak zones may be zones of the envelope that are more fragile and liable to rupture as a result of an increase in pressure inside the envelope. For example, the weak zones may be made by thinning the envelope 31 locally or by pre-cutting an opening through only a portion of the envelope thickness. In this case, the envelopes may be sealed until the weak zones 34 are ruptured.

Furthermore, the electrical conductor 7 associated with the module 3 may preferably be arranged along a second side 35 of the envelope 31, opposite the first side 32. Thus, the electrical conductor 7 may be moved away from the weak zones along the greatest length of the module 3.

Figure 4:
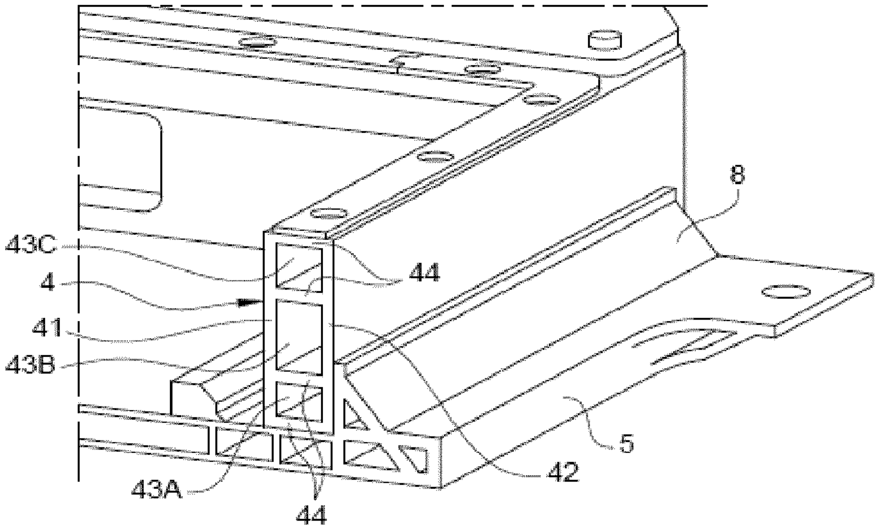
FIG. 4 is a cross-section view of the structure in FIG. 2.

An example embodiment of the structure 4 is clearly visible in FIG. 4. The structure 4 is a double-walled structure. Said structure comprises an inner wall 41, facing the different modules 3, an outer wall 42 oriented towards the outside of the device 2, and at least one chamber defined between the inner wall 41 and the outer wall 42. More particularly, according to the embodiment illustrated, the structure 4 comprises three chambers 43A, 43B and 43C positioned one above the other. The inner wall 41 is connected to the outer wall by four connecting walls 44. Alternatively, there may be any number of chambers, for example one or two chambers. The different chambers may be closed volumes and separate from each other.

The structure 4 may be formed by assembling different profile segments. These segments may advantageously be obtained by a material extrusion process, notably using aluminum. The inner wall 41 and the outer wall 42 may extend vertically substantially parallel to each other. The connecting walls 44 may extend substantially horizontally. Thus, a section of the structure 4 as shown in FIG. 4 may have an overall rectangular shape. Alternatively, the shape of this section may be different, for example square, triangular, or trapezoidal. Brackets 8 may be attached to the outer wall 42 to fasten the bottom cover 5.

The inner wall 41 of the structure 4 includes a set of openings 45 (shown schematically in FIGS. 1 and 2) positioned opposite the weak zones 34 of each module. "Opposite" means that the openings are positioned opposite the weak zones 34 of each module, at a short distance and without any interposed elements. Advantageously, the weak zones 34 are less than 50 mm away from the openings 45, notably less than 40 mm, preferably less than 30 mm, or even approximately 20 mm. A space between the openings 45 and the corresponding weak zones 34 may nevertheless be necessary, for example to enable easy assembly of the modules within the structure, and to anticipate dimensional variations related to manufacturing tolerances and/or thermal expansion.

The openings 45 thus allow the volume containing the modules 3 to communicate with at least one of the chambers 43A, 43B, 43C. The outer wall 42 is provided with at least one discharge opening 46. In this case, two discharge openings 46 are arranged on either side of the midline X. The discharge openings 46 are not positioned opposite the openings 45 formed in the inner wall. Advantageously, at least one of the chambers 43A, 43B, 43C forms at least locally a gas discharge chamber 47 from the openings 45 towards the discharge openings 46. This discharge chamber is not an element attached to the device 2 but, on the contrary, is built directly into the structure 4 supporting the modules 3.

According to a first variant embodiment, all of the openings 45 may communicate with the same chamber 43A, 43B or 43C. In another variant embodiment, the individual openings 45 may communicate with separate chambers of the structure. In any case, discharge openings 46 are of course provided for each chamber that gases are liable to enter. This enables different gas flows to be handled differently, and in particular makes it possible to limit the risk of a gas that has entered a chamber through a first opening 45 from subsequently entering the volume containing the modules through a second opening 45.

Advantageously, the discharge openings 46 may be spaced apart from the openings 45 formed in the inner wall by a distance strictly greater than the distance separating the weak zones 34 from the openings 45. For example, this distance can be at least 60 mm, preferably at least 70 mm, or even at least 80 mm.

Figure 5:
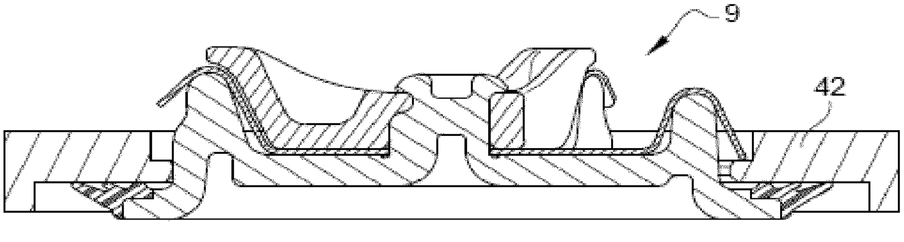
FIG. 5 is a cross-section view of a valve of the energy storage device.

The device 2 also includes valves 9 that are arranged in each of the discharge openings 46 and designed to open gradually in the event of excess pressure in the chamber with which said valve communicates. These valves, an example embodiment of which is shown in FIG. 5, may include an elastic element such as a spring. Said valves can be set to open gradually when the gas pressure in the corresponding chamber reaches or exceeds a given threshold. When these valves are closed, the casing may be hermetically sealed, i.e. gases cannot escape from the casing until the pressure therein has reached the opening pressure of the valves.

Advantageously, the surface area of the openings constituting the weak zones 34 is strictly smaller than the surface area of the openings 45 and strictly smaller than a flow area of the valves 9. The flow area of the valves 9 can be between the surface area of the weak zones 34 and the surface area of the openings 45. For example, an opening forming a weak zone 34 may have a surface area of between 300 $mm^2$ and 400 $mm^2$ inclusive. An opening 45 may have a surface area of between 500 $mm^2$ and 700 $mm^2$ inclusive. The flow opening of the valves 9 can be between 400 $mm^2$ and 500 $mm^2$ inclusive.

In order to manufacture the device 2 as set out above, the structure 4 can be manufactured by assembling extruded aluminum segments incorporating the openings 45 and 46. These openings can be made by simple drilling. Advantageously, the proposed dimensions for the openings 45, 46 are both small enough to have little effect on the rigidity of the structure 4 and large enough to efficiently discharge the gases. The valves 9 can be simply fitted into the corresponding openings 46. The modules 3 can be positioned inside the structure 4 between the cross members 6. The modules 3 are then fastened directly or indirectly to the structure 4 so that the weak zones 34 are positioned opposite the openings 45.

When the vehicle is running, electric currents can flow through the electrical conductors 7. Large potential differences may develop between adjacent electrical conductors. For example, this potential difference (illustrated by an arrow F1 in FIG. 1) can be as high as 400 V. The electrical conductors 7 are however spaced far enough apart to prevent the formation of an electric arc under normal operating conditions.

If an electrochemical module 3 or an electrochemical cell contained within a module develops a fault, gas (illustrated by reference sign 10 in FIG. 1) may form in the module. The gas increases the pressure inside the envelope 31 of the module and eventually escapes from the module 3 through one of the weak zones 34. Since this weak zone is positioned a short distance from an opening 35, the gas naturally flows into one of the chambers 43A, 43B, 43C. Advantageously, the surface area of the opening is strictly greater than the surface area of the weak zone so that all or almost all of the gas flow can pass from the cell 3 to the chamber formed in the structure 4. The gas pressure inside the chamber increases until high enough to open the valve 9. The gas then escapes from the structure 4 through the valve 9. A gas flow (shown by an arrow F2 in FIG. 1) is then established from the inside of the device to the outside. This gas flow creates a suction effect that draws the gas into the opening 45. The gas is therefore not distributed about the modules inside the casing, and in particular does not get close to the electrical conductors 7. This reduces the risk of an electric arc forming in the event of gas discharge in one of the modules. The positioning of the electrical conductors 7 on the side of the modules opposite the weak zones 34 further reduces this risk.

Furthermore, hot gases escaping from one module are also prevented from heating up adjacent electrochemical modules, which would cause thermal runaway.

Advantageously, the presence of a valve prevents the fresh air from entering the device 2 in the opposite direction to the gases. This prevents oxygen from entering the device, which could lead to a fire.

Advantageously, the walls of the structure 4 have a high thermal inertia and enable the gases to be cooled as said gases are discharged. This reduces the risk of spontaneous combustion of the gases at the outlet of the valve.

The invention claimed is:

1. An energy storage device, comprising:

a set of electrochemical modules and a casing containing said modules, the casing comprising a double-walled structure, each module comprising electrochemical cells and an envelope containing said electrochemical cells, the envelope being provided with at least one weak zone enabling gases contained inside the module to escape, said structure comprising an inner wall an outer wall, and at least one chamber formed between the inner wall and the outer wall, the inner wall being provided with a set of openings positioned opposite the at least one weak zone of each module, and the outer wall being provided with at least one discharge opening, wherein the at least one weak zone formed in the envelope of each module is an opening, and wherein the opening of the envelope is the only opening in the envelope.

2. The energy storage device as claimed in claim 1, wherein said structure is an extruded structure.

3. The energy storage device as claimed in claim 1, wherein said structure is an extruded aluminum structure.

4. The energy storage device as claimed in claim 1, wherein the opening of the envelope is a circular opening.

5. The energy storage device as claimed in claim 1, wherein a surface area of each opening of the set of openings in the inner walls of said structure is strictly greater than a surface area of the opening of the envelope.

6. The energy storage device as claimed in claim 1, wherein the at least one weak zone is arranged along a first side of each module, and the energy storage device comprises electrical conductors connecting the modules together, the electrical conductors being arranged along a second side of each module, substantially opposite the first side, the electrical conductors being arranged substantially towards a center of the energy storage device.

7. The energy storage device as claimed in claim 1, wherein the set of electrochemical modules comprises two parallel rows of electrochemical modules, the energy storage device comprising electrical conductors arranged substantially in an interface zone between the two parallel rows.

8. The energy storage device as claimed in claim 1, wherein a distance between each weak zone and the opening in the opposing inner wall is equal to or less than 50 mm.

9. The energy storage device as claimed in claim 1, wherein said at least one chamber forms at least locally a gas discharge chamber towards the at least one discharge opening.

10. The energy storage device as claimed in claim 9, wherein said at least one chamber comprises at least two distinct chambers defined between the inner wall and the outer wall of the structure, the at least two chambers forming at least locally two distinct gas discharge chambers towards at least two distinct discharge openings.

11. The energy storage device as claimed in claim 1, further comprising at least one valve configured to open in an event of excess pressure in said at least one chamber, the at least one valve being arranged in the at least one discharge opening.

12. The energy storage device as claimed in claim 1, further comprising cross members separating adjacent electrochemical modules, the cross members being fastened to said structure.

13. A motor vehicle, comprising the energy storage device as claimed in claim 1.

14. The energy storage device as claimed in claim 1, wherein the inner wall is parallel to the outer wall, and the at least one discharge opening in the outer wall is not positioned opposite to the set of openings in the inner wall.

* * * * *